United States Patent [19]

Johnson

[11] 3,899,182
[45] Aug. 12, 1975

[54] HIGH TEMPERATURE SEAL
[75] Inventor: John N. Johnson, Utica, Mich.
[73] Assignee: General Motors Corporation, Detroit, Mich.
[22] Filed: Mar. 28, 1974
[21] Appl. No.: 455,675

Related U.S. Application Data
[63] Continuation-in-part of Ser. No. 414,748, Nov. 12, 1973, abandoned.

[52] U.S. Cl............. 277/96 R; 106/286; 423/594; 277/234; 165/9
[51] Int. Cl.......................................... F28d 19/00
[58] Field of Search........ 277/96 R, 96 A, 227, 234; 423/594, 595, 607; 106/286; 165/9

[56] References Cited
UNITED STATES PATENTS
2,092,059  9/1937  Frazer.................. 423/595 X
2,733,129  1/1956  Arnold.................. 423/595
3,666,001  5/1972  Johnson................ 277/234 X Primary Examiner—Robert I. Smith
Attorney, Agent, or Firm—Lawrence B. Plant

[57] ABSTRACT

A rubbing contact fluid seal, particularly suitable for use in a gas turbine engine rotary regenerator, comprising a reticulate metal facing layer bonded to a base member and adapted for rubbing contact with the regenerator, the facing layer having disposed in the pores thereof and bonded thereto a seal material consisting essentially of potassium silicate-bound synthetic copper chromite and chromic oxide in which the copper chromite and chromic oxide together comprise about 88 to 92 percent by weight of the seal material.

3 Claims, 5 Drawing Figures

3,899,182

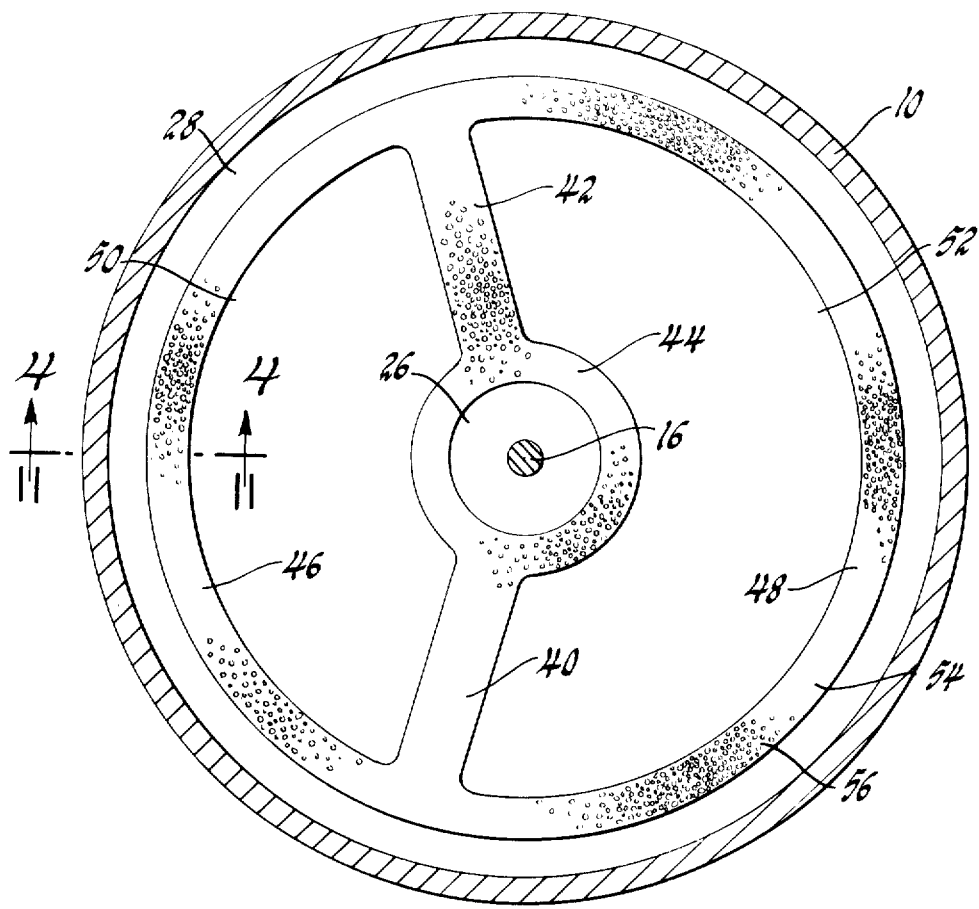
Fig. 3
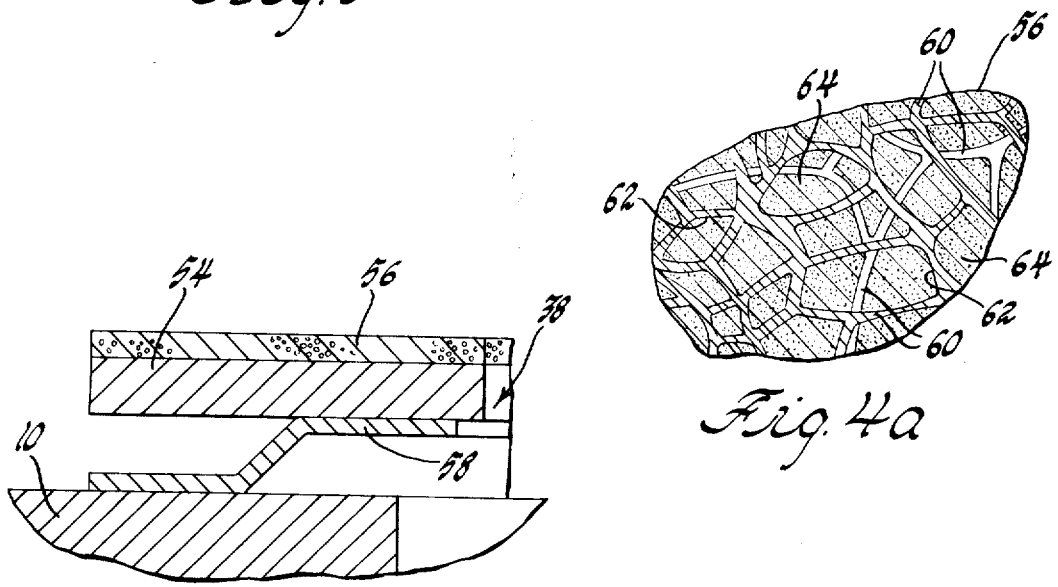
Fig. 4
Fig. 4a

HIGH TEMPERATURE SEAL

This is a continuation-in-part of Ser. No. 414,748, filed Nov. 12, 1973 and now abandoned.

This invention relates to an improved rubbing contact fluid seal suitable for use in a rotary regenerator for gas turbine engine applications and, more particularly, to an improved fluid seal material for such applications the composition and properties of which are controllable and which has low coefficients of friction at the elevated temperatures of gas turbine engine exhaust gases. More particularly, this invention is a modification of my earlier U.S. Pat. No. 3,666,001, issued May 30, 1972 and involves replacing the naturally occurring chromites with a mixture of copper chromite and chromic oxide in which the copper chromite varies from about 47 to about 88 percent by weight and chromic oxide varies from about 53 to about 12 percent by weight of the mixture.

Currently, there is a family of gas turbine engines which use rotating disc-type regenerators to recover usable heat from exhaust gases to preheat incoming combustion air. A necessary requirement of the regenerator system is an effective seal across the faces of the rotating disc to prevent leakage of the high pressure incoming air into the counterflowing exhaust gas. A rubbing seal is desired as it has the potential for lowest leakage. These rubbing seals are required to operate at a maximum temperature of about 600°F on the outboard or cold side of the seal and at temperatures up to 1,200°F on the inboard or hot side of the seal. The desired properties of the rubbing seal material are that it have good oxidation resistance and thermal stability, good wear resistance, a relatively low coefficient of friction over a wide range of temperatures, and that it exhibit overall compatibility with the regenerator matrix material. In addition, since metallic regenerators assume a slight spheroidal inward bulge during operation, the seal must be flexible enough to conform to the shape of the regenerator. My earlier invention (U.S. Pat. No. 3,666,001) had these desired properties and the seal material thereof exhibits not only a relatively low coefficient of friction, low wear rate and good thermal stability at elevated temperatures in an oxidizing environment but also increased resistance to attack by sulfur-containing compounds, particularly $SO_2$ and $SO_3$, in the gas turbine engine exhaust gases which results in longer seal life particularly at portions of the hot side of the seal which are continually exposed to engine exhaust gases.

One of the problems with the earlier material is that it is a naturally occurring mineral and accordingly, close control of the composition and properties thereof may not always be possible. Moreover, while the coefficient of friction of the natural chromites is adequately low, it is desirable to obtain even lower coefficients. My new seal material meets both these needs.

Accordingly, it is an object of my invention to provide an improved rubbing contact fluid seal for use in the regenerator portion of a gas turbine engine, the composition and properties of which seal are controllable and which has low friction properties at temperatures typical of those found in gas turbine engines.

In a preferred embodiment of my invention this object and others are accomplished by providing a seal having a metallic base and a reticulate nickel facing layer adapted for rubbing contact with a rotating regenerator matrix and characterized by fibrils forming a substantially uniform, three-dimensional skeletal network with interconnected pores therebetween bonded to the base with the seal being held against the regenerator matrix such that the facing layer is continuously in rubbing contact with the opposed radial faces of the matrix. In accordance with the principal feature of my invention the pores of the facing layer are filled with a seal material consisting essentially of, by weight, about 88 to 92 percent of a mixture comprising synthetic copper chromite and chromic oxide powders in a potassium silicate binder. The material is bonded to the fibrils of the facing layer by a low temperature oven cure wherein the potassium silicate binder forms a bond between the copper chromite powder and the facing fibrils.

As used herein the term "copper chromite" refers to $Cu_2Cr_2O_4$ which has a hexagonal crystal structure and is formed by calcining $CuO$ and $Cr_2O_3$ together at 2,200°F in air according to the following reaction:

$$4CuO + 2Cr_2O_3 \rightarrow 2Cu_2Cr_2O_4 + O_2.$$

The stoichiometric reaction mixture is 51.1% $CuO$ and 48.9% $Cr_2O_3$, but for purposes of this invention the reaction mixture need not reach that level. In this regard seals have been made with calcining reaction mixtures of about 25 to about 45% $CuO$ and the balance $Cr_2O_3$. After calcining these reaction mixtures yield seal mixtures of about 47 to about 88 percent copper chromite and the balance chromic oxide. Such materials may be synthesized by wet ($H_2O$) ball milling $CuO$ and $Cr_2O_3$ powders together to produce an intimate mixture, drying the mixture and then calcining it to cause the $CuO$ and $Cr_2O_3$ to react and form the copper chromite and chromic oxide mixture of this invention. A typical calcining treatment is 4 hours at 2,200°F in air. After calcining, the material is hammer milled to produce minus 200 mesh powder. Other techniques for forming copper chromites are known and examples of such techniques are disclosed in U.S. Pat. No. Frazer 2,031,475 issued Feb. 18, 1936.

Other objects and advantages of my invention will become more apparent from the following detailed description of the invention reference being had to the accompanying drawings, of which:

FIG. 3 is a sectional view of the same taken in a plane indicated by the line 3—3 in FIG. 1;

FIG. 4 is an enlarged view of a portion of the seal shown in FIG. 1; and

FIG. 4a is an enlarged view of a portion of FIG. 4.

Figure 1:
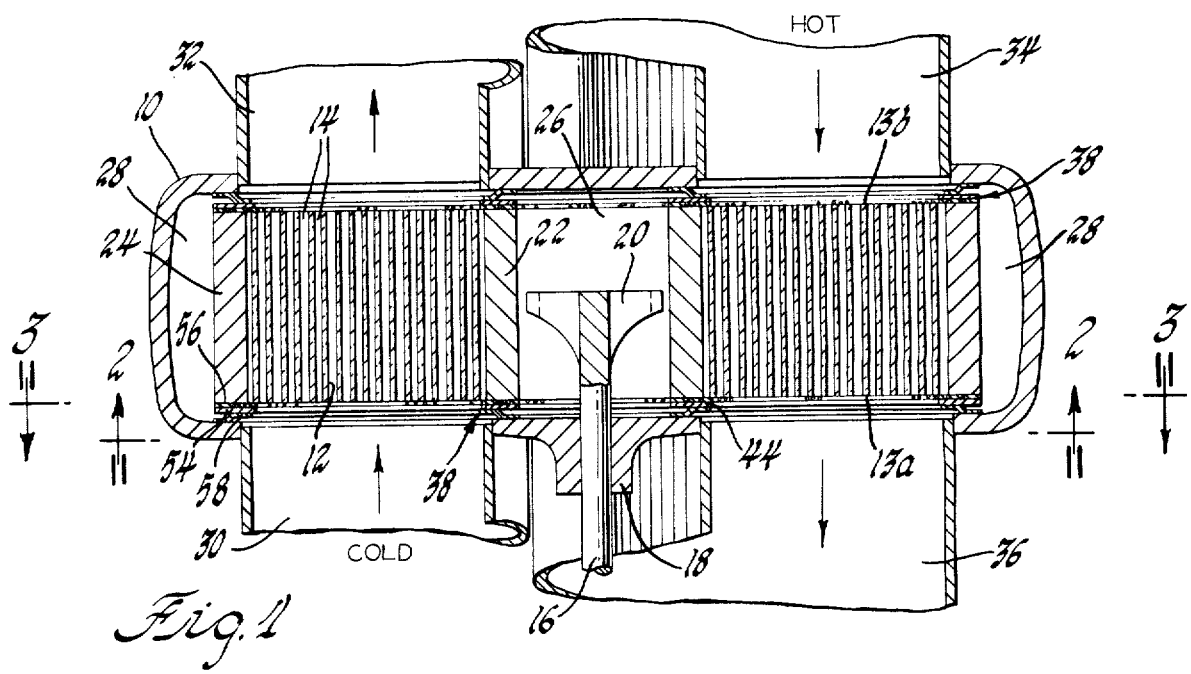
FIG. 1 is a schematic sectional view of a rotary regenerator taken on the plane indicated by line 1—1 in FIG. 2.
Figure 2:
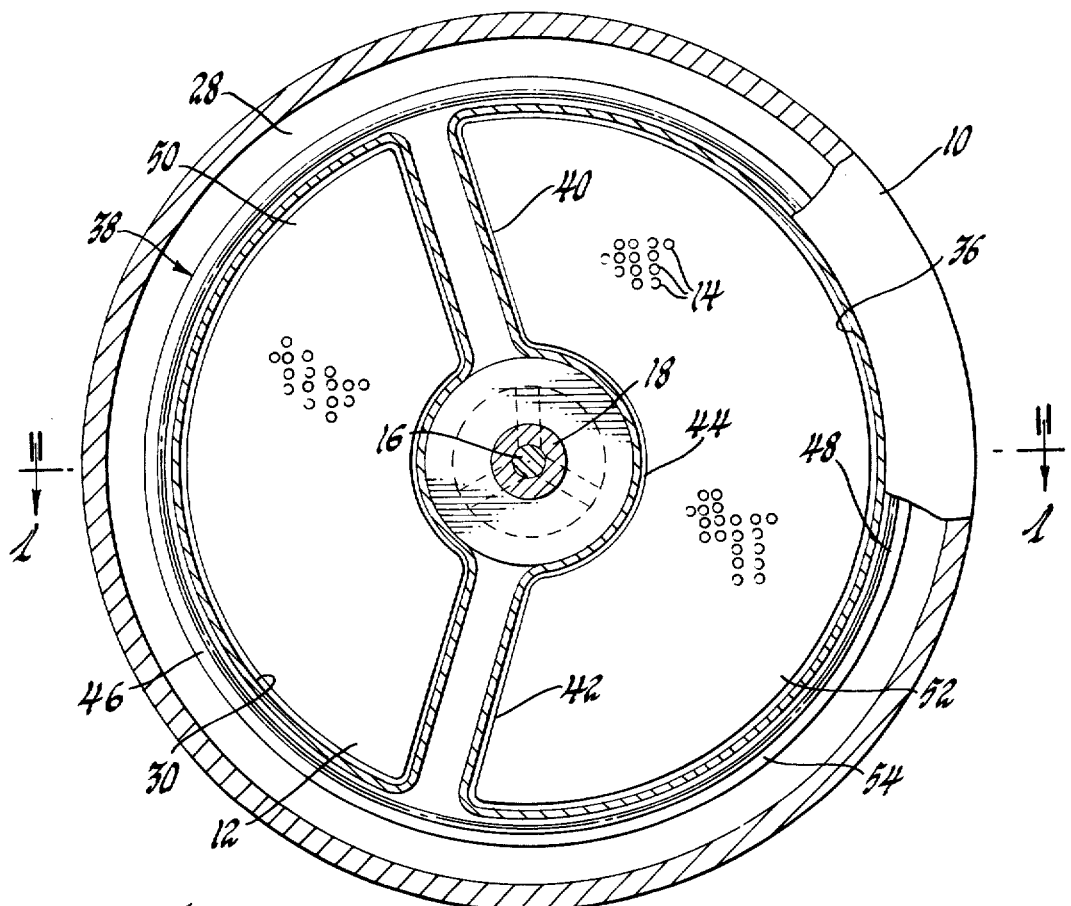
FIG. 2 is a sectional view of the same taken in a plane indicated by the line 2—2 in FIG. 1.

FIGS. 1 to 3 generally show schematically a disc-type rotary regenerator portion of a gas turbine engine (not shown). Referring first to FIG. 1, the regenerator comprises a housing 10 which is generally drum-shaped and which encloses an annular matrix 12 which is of a structure defining pores or passages 14 (greatly enlarged in FIG. 1) extending between the opposed radial faces 13a and 13b of the matrix generally parallel to the axis of rotation defined by a driving shaft 16. The matrix 12 is fabricated from alternate spiral layers of flat and corrugated stainless steel sheet stock or a ceramic. Shaft 16 is mounted in suitable bearings in a boss 18 on the housing and terminates in a spider 20 which is coupled by means (not shown) to the matrix so that the matrix may be rotated slowly. The matrix preferably includes a non-porous inner rim 22 and a non-porous outer rim 24. A generally cylindrical space 26 is defined within the interior of the matrix and a space 28 extends around the periphery of the matrix within the housing 10. An inlet 30 for cold, high pressure air enters one face of the housing and opposite to it an outlet 32 is provided for the heated compressed air. The hot, low pressure exhaust gases enter through an inlet 34 and leave the regenerator through an outlet 36, the two streams thus being in counterflow relation.

A seal 38 is provided between each radial face of the matrix and the housing in rubbing contact with the rotating matrix to confine the cold and hot gases to the desired paths through the matrix from inlet to outlet and thereby minimize leakage between the paths. As shown more clearly in FIGS. 2 and 3, such a seal comprises two arms 40 and 42 extending radially of the matrix base preferably joined at the inner rim of the matrix by a circular seal portion 44 extending around the interior cavity 26 and joined at the outer rim of the matrix by an arcuate rim or bypass seal 46 extending around the high pressure path and an arcuate rim seal 48 extending around the low pressure path. The seal assembly thus defines an opening 50 for the cold, high pressure air and an opening 52 for the hot, low pressure exhaust gas. These openings, as shown in FIG. 2, conform generally in the outline of the ducts 30 and 32, and 34 and 36, respectively.

The seal 38 in rubbing contact with the matrix 12 comprising portions defining the arms 40 and 42, the inner seal portion 44 and the outer seal portion comprised of arcs 46 and 48, as indicated in FIGS. 2 and 3, is comprised of a stationary base member 54 which is a flat sheet of metal, for example, a stainless steel sufficiently thick to be reasonably stiff and rigid, but sufficiently flexible to curve slightly in accordance with any distortion of the matrix, and a facing layer 56 which covers the forward or matrix face of the base 54, as shown in FIG. 3. During engine operation, the seal is held against the regenerator by a gas pressure differential between the high pressure incoming air and the low pressure exhaust such that the facing layer 56 is continuously in rubbing contact with the rotating matrix 12. The pressure differential also acts to hold flexible metal leaf seals 58 (FIG. 4) which are welded to the base 54 against the adjacent housing 10.

Referring now to FIG. 4a, the facing layer 56 is a porous structure characterized by fibrils 60 which form a threedimensional skeletal network with pores 62 therebetween. In accordance with the principal feature of my invention the pores 62 of the facing 56 are filled with a seal material 64 which consists of a copper-chromite and chromic oxide power in a potassium silicate binder. The composition and properties of this material can be closely controlled and it performs with a lower friction coefficient than the natural chromites, and exhibits low wear rates and good chemical stability at high temperatures in an oxidizing environment which are necessary requirements for a seal material for use in a gas turbine engine rotary regenerator. In addition, this material exhibits excellent resistance to attack by sulfur-containing exhaust gases. The seal material 64 fills the pores 62 of the facing layer 56 and is bonded to the fibrils 60 such that the facing retains and reinforces the copper-chromite and chromic oxide seal material and allows the seal to flex as the regenerator distorts in operation.

The porous facing may be of any of the well-known cellular, reticular or sintered type structures having a porosity and pore configuration such that the copper-chromite and chromic oxide seal material forms a major part of the rubbing contact surface while the facing acts only as a support structure forming a minor part of the rubbing contact surface. In this manner the friction characteristics of the seal will be mainly those of the copper-chromite and chromic oxide material with the friction characteristics of the facing having only a minimal effect. It is also desirable that the facing be of a material having thermal expansion properties similar to the copper-chromite and chromic oxide material, the base 54 and the matrix 12 to minimize distortion or warpage due to different coefficients of thermal expansion between materials. Nickel or nickel alloys containing predominately nickel have been found to be suitable materials for the facing. I have found that a reticulate-type structure (shown schematically in FIG. 4a) which is a three-dimensional skeletal structure of interconnected fibrils with no membranes or windows partitioning the contiguous pores, such as that described in an article appearing in the April, 1968 issue of Materials Engineering at page 44, to be a preferred facing structure because the reticulate structure allows the seal material to flow bewteen the interconnected pores and form a continuous seal phase. The structure described in the article is a metal foam produced by electroplating a layer of nickel on a reticulated urethane substrate to produce a continuous metal network of interconnected pores with a pore density of 10 to 100 pores per inch. The Ball U.S. Pat. No. 3,111,396 discloses an alternative method of forming the metal foam by depositing a slurry of a liquid and finely divided metal powder on an open-pore type organic structure such as polyurethane and then sintering the coated structure to produce a continuous skeletal metal structure. I have found that a reticulate nickel foam having a density of about 45 pores/inch serves as an excellent facing material.

The rubbing seal 38 for use in a rotary regenerator is formed by first disposing the porous facing layer about one-eighth inch thick on the base 54 (FIGS. 3 and 4) and bonding the facing thereto such that the facing conforms to and covers arms 40 and 42 and rims 44, 46 and 48. In my preferred seal construction, the base 54 is formed of type 430 stainless steel and is about 0.060 inch thick. The members are bonded together by conventional powder furnace brazing. A suitable braze material is Nicrobraz 30, a product of Wall Colmonoy Corp., which has a typical composition of 71 percent nickel, 19 percent chromium and 10 percent silicon.

The facing is filled by first preparing a slurry composition consisting of from about 69 wt percent of copper chromite or chromic oxide powder and from about 31 wt percent aqueous potassium silicate solution. A suitable type of aqueous potassium silicate solution is Kasil No. 1, a product of the Philadelphia Quartz Co. which, as shown below, contains about 29.1 percent, by weight, potassium silicate and which has the following properties as listed by the manufacturer:

| | |
|---|---|
| Weight ratio $SiO_2/K_2O$ | 2.50 |
| Weight % $SiO_2$ | 20.8 |
| Weight % $K_2O$ | 8.30 |

| | |
|---|---|
| -Continued | |
| Density, °Be | 29.8 |
| Density, lbs/gal | 10.5 |
| Viscosity, centipoises | 40 |

The slurry composition is placed in a vertically positioned tube having an opening surrounded by an annular disc placed tightly against the facing. Pulses of air are applied to the slurry by means of a solenoid valve arrangement whereby the slurry flows out the opening and into the support. The base seals the bottom side of the facing while the annular disc seals the top thereby causing the slurry to flow concentrically outward filling the pores of the facing.

After filling, the seal is subjected to an oven curing treatment to remove the water from the slurry and to bond the copper-chromite and chromic oxide powder to the facing fibrils, as previously mentioned. The curing treatment used is as follows:

Heat to 150°F, hold for 2 hours
Heat to 175°F, hold for 1 hour
Heat to 200°F, hold for 1 hour
Heat to 225°F, hold for 1 hour
Heat to 250°F, hold for 1 hour
Heat to 500°F, hold for 1 hour All heating rates above 150° are at 50°F per hour. The curing treatment is performed in a step-like manner in order to avoid bubbling of the potassium silicate. With the water removed, the composition comprises about 88 wt percent copper-chromite/chromic oxide and the balance potassium silicate.

One inch diameter test buttons were made from this material and held in a stationary fixture against a rotating regenerator-like disc having a construction similar to that of a full size regenerator. The following test parameters were used:

| | |
|---|---|
| Disc material | type 430 stainless steel |
| Disc braze material | copper |
| Seal temperature | 880° – 1200°F |
| Load | 5 – 10 psi |
| Air pressure | 1.5 psig |
| Disc Sliding Speed | 30 – 160 feet/minute |
| Test time | ca. 3 hours |

The tests showed that at about 1,200°F, 5 psi seal pressure and 93 ft/min speed, the coefficient of friction varied from a low of 0.14 to a high of 0.36 with most of the samples nearer about 0.18. At 10 psi seal pressure and 93 ft/min speed, the samples consistently showed coefficients of friction of about 0.18. Other 5 psi tests at 800°F and speeds varying between 30 and 160 feet per minute yielded coefficients of friction ranging from 0.16 to 0.20. Depending on the particular test, the regenerator wear ranged from nil to about 1 mil and the seal wear from nil to about 2 mils.

Although my invention has been described in terms of preferred embodiments with reference to a particular rotary regenerator structure, it will be appreciated that other forms may be adopted within the scope of my invention. For example, in many regenerator operations the outboard or cold side of the seal and the rim of the hot side seal operate at less than 800°F. In this case my seal material may be replaced in these regions with graphite, which has a coefficient of friction of about 0.05 but which oxidizes above 800°F, with my seal material being used only on seal regions which operate at temperatures up to 1,200°F.

Thus having described my invention what is claimed is:

1. A rubbing contact fluid sealing member comprising a base member and a porous layer formed of a metal having temperature resistance and oxidation and sulfidation resistance at temperatures in excess of 1,200°F adapted for rubbing contact bonded to at least a portion of said base member with a seal material filling the pores of said layer and bonded therein, said layer having a pore density in the range of about 10 to 100 pores/inch, and said seal material consisting essentially of a potassium silicate-bound mixture of copper chromite and chromic oxide in which the mixture contains about 47 to about 88 percent copper chromite and comprises about 88 to 92 percent by weight of the seal material.

2. A rubbing contact fluid sealing member comprising a base member, a porous, reticulate nickel foam layer having a pore density of about 30 to 60 pores/inch bonded to at least a portion of said base member and adapted for rubbing contact and a seal material filling the pores of said layer, said seal member consisting essentially of a potassium silicate-bound mixture of copper-chromite and chromic oxide in which the mixture contains about 47 to about 88 percent copper chromite and comprises about 88 to 92 percent by weight of the seal material.

3. A fluid seal for use in the rotary regenerator portion of a gas turbine engine, said portion including a housing adapted to enclose a rotating regenerator matrix, said seal comprising, in combination, a stationary metal base and a reticulate layer formed of a metal having temperature resistance and oxidation and sulfidation resistance at temperatures in excess of 1,200°F characterized by fibrils forming a three-dimensional skeletal network with interconnected pores therebetween bonded to at least a portion of said base, and means for retaining said base member between said housing and said matrix with said layer being adapted for rubbing contact with said rotating regenerator matrix, said layer having a pore density in the range of about 30 to 60 pores/inch, the pores of said layer being filled with a seal material bonded therein, said seal material consisting essentially of a potassium silicate-bound mixture of copper chromite and chromic oxide in which the mixture contains about 47 to about 88 percent copper chromite and comprises about 88 to 92 percent by weight of the seal material.

* * * * *